No. 813,265. PATENTED FEB. 20, 1906.
V. WHITMAN.
PROCESS OF DRY CURING FISH.
APPLICATION FILED MAR. 15, 1905.

Witnesses,
Chas. E. Chapin
J. H. Nurse

Inventor,
Victor Whitman
By Geo. H. Strong, atty.

UNITED STATES PATENT OFFICE.

VICTOR WHITMAN, OF SAN FRANCISCO, CALIFORNIA, ASSIGNOR TO ALASKA CODFISH COMPANY, OF SAN FRANCISCO, CALIFORNIA, A CORPORATION.

PROCESS OF DRY-CURING FISH.

No. 813,265.     Specification of Letters Patent.     Patented Feb. 20, 1906.

Application filed March 15, 1905. Serial No. 250,202.

*To all whom it may concern:*

Be it known that I, VICTOR WHITMAN, a citizen of the United States, residing in the city and county of San Francisco and State of California, have invented new and useful Improvements in Processes of Dry-Curing Fish, of which the following is a specification.

My invention relates to a process which is especially designed for the dry-curing of salted fish, such as codfish and the like.

It consists in first warming the fish and circulating currents of air above and below the fish-supports and in cooling the air to reduce its temperature and again circulating the cooled air over the fish.

In the accompanying drawings I have shown an apparatus by which my process may be carried out.

Figure 1:
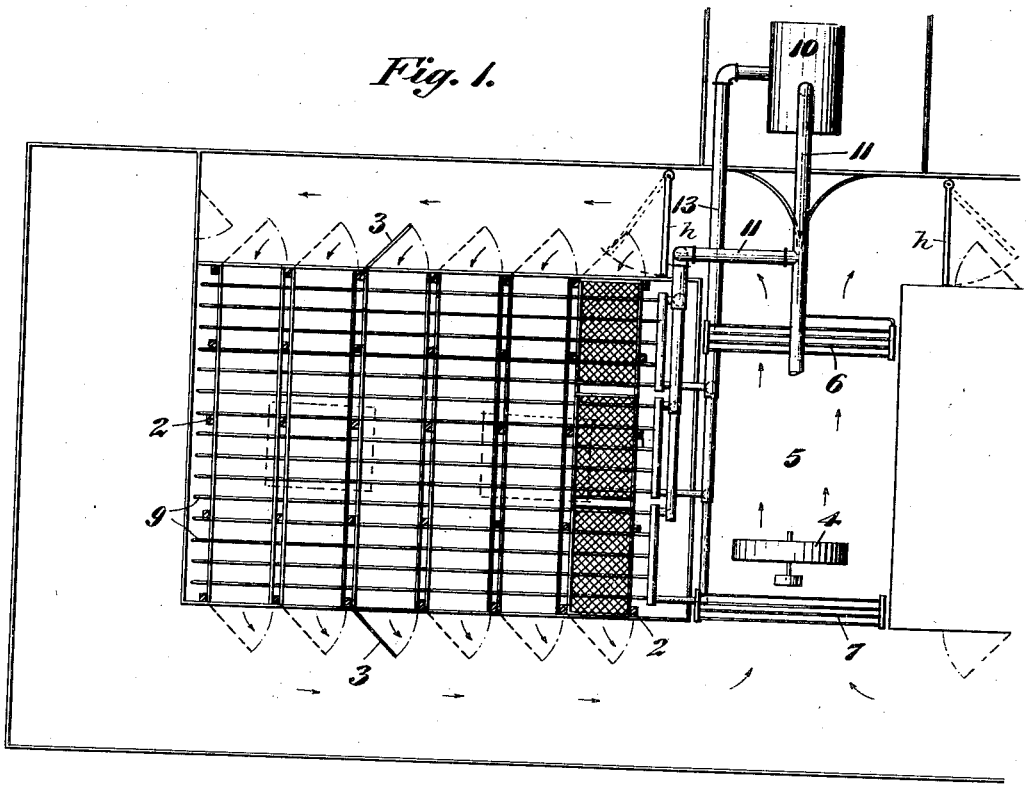
Figure 2:
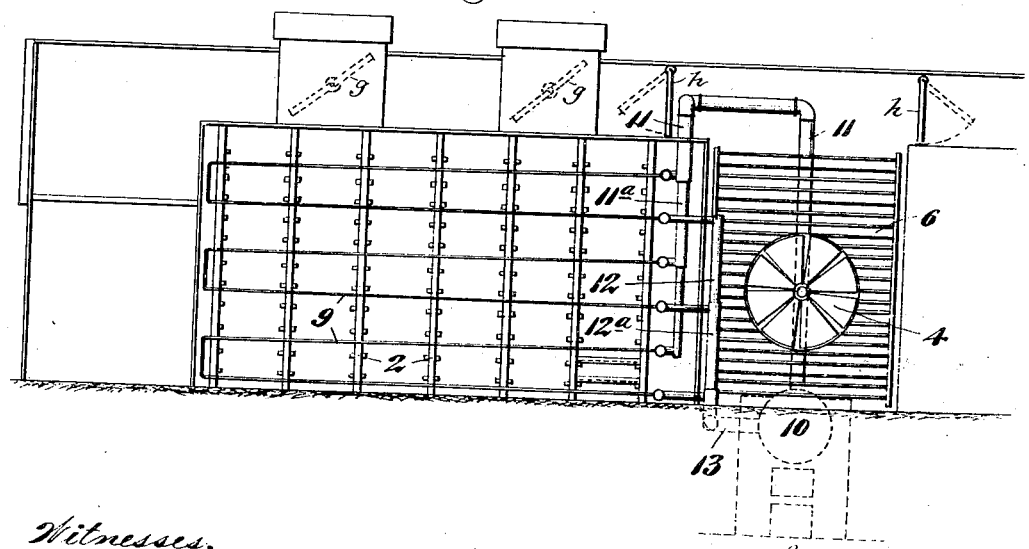

Figure 1 is a sectional plan view of my drier. Fig. 2 is a longitudinal section of same.

It has been customary to dry fish, such as codfish and the like, by spreading them after being properly cleaned and salted upon what are known as "flakes" and these exposed in the open air until the fish are in a sufficiently dry condition. Such drying is dependent altogether upon atmospheric conditions and takes a long time, and as the fish contains more or less gluten it is desirable to dry or harden this gluten, so that it retains its firmness. Being exposed to too great a heat by artificial drying it will become soft and oily, which is objectionable.

It is the object of my invention to provide a method by which currents of air of greater and less temperature may be alternately passed over the trays or flakes containing the fish and means whereby the fish may be first warmed and air then circulated over them, the air being alternately heated for use and cooled to condense moisture which it may have accumulated before again passing it through the drying-chambers.

I here describe a suitable apparatus for carrying out my process. This apparatus consists of an exterior building or buildings of suitable size and construction to suit the work which is to be carried on. Within the building are vertical posts, as at 2, extending in parallel lines and having upon them horizontally-disposed ribs or supports upon which the trays are slidable, the distance between the posts being such as to allow for the desired width of trays or flakes, which rest upon the supporting-ribs and which may thus be pushed in from one end until the trays form a series of superposed passages which are substantially closed by the fish which are spread upon the trays. A vertical circulation of air will take place when desired by reason of the open spaces between the edges of the trays upon each side of the posts 2, and these spaces are sufficient for ventilation and to allow the heated air to escape upwardly as may be desired. A series of chambers formed between the superposed trays are each independently closed by doors at the ends, as shown at 3. These doors may be opened for the purpose of introducing and removing the trays as required, and the openings may also be adjusted while the curing process is being carried on, so as to regulate the amount of air which passes through the apparatus. The top is closed and has ventilating-openings with controlling-gates $g$, by which the heating and cooling of the fish may be regulated.

The "stacks," as they may be called, which contain the trays, do not occupy the full width of the building, but leave a space or conduit at each end of the rows of trays for the ingress and egress of air and for working space.

For the purpose of circulating the air horizontally through the spaces between the trays I have shown a fan or air-forcing mechanism of any suitable description, as at 4. The air is forced by this fan through a passage, as at 5, and passes over a series of heated pipes, as at 6. These pipes may be heated, preferably, by steam or hot water and are sufficiently numerous to raise the temperature of the air to the desired degree. The air after passing through this heater is directed into the conduit at one end of the rows of trays, and passing through the doors 3 the air will pass between the superposed rows of trays and escape into the open conduit at the opposite end of the trays. This conduit connects directly with the inlet of the air-forcing mechanism 4, so that the air after passing through the trays is again returned to pass through the air-forcing mechanism to be again reheated and circulated. After the flow of heated air has continued for a certain time it is necessary to the success of the process to pass a current of cool air over the fish.

This is effected by the use of a refrigerator or cooler 7, which may consist of a series of pipes suitably cooled and through and between which the air is passed and its temperature reduced sufficiently before the air is again passed through the fan. The temperature of the cooler and that of the heating-coil may be regulated in any suitable manner, and the air may also be deprived of just sufficient moisture to give the desired results in curing the fish. The variation in the temperature will insure an exact result in this particular. A certain amount of the air will escape upwardly through the intermediate channels between the posts upon which the drying-trays are supported, as previously described, and also through the ventilators, and sufficient fresh air to compensate this loss will enter through various openings in the walls of the building.

In conjunction with the air-circulating means here described I employ heating-pipes, as at 9. These pipes are located between the trays of fish and extend from one end to the other between one set of trays and may return through a succeeding space, so that substantially each line of trays will have a heating-pipe both above and below it, and each line of pipe will also lie between the two contiguous superposed rows of trays. I have found that hot water for this purpose is very satisfactory. Heat for this purpose is supplied from any suitable boiler, as at 10, and by means of a main conducting-pipe 11 a sufficient quantity of heat is conveyed from the boiler to supply the pipes passing between the trays. This main pipe may have a sufficient size to carry all the requisite heat to the point where the first line of pipe 9 is taken out. The return portion of this pipe discharges into a receiving-pipe 12 of sufficient size and independent of the main pipe. The main pipe is reduced, as shown at 11$^a$, after the first distributing-pipe 9 is taken out, and the next distributing-pipe takes its supply from this reduced portion and returns it into a section 12$^a$, which is continuous with the section 12, but is enlarged sufficiently to receive the added amount of heating medium. Thus the main conducting-pipe is reduced after each distributing-pipe 9 has been taken out, and the receiving and return pipes are correspondingly enlarged. From the last of these return-pipes the heating medium is returned to the boiler through a pipe 13. Thus a circulation is maintained. The temperature of the heating medium may be easily controlled, so that only a sufficient amount of heat will be distributed between the trays for the proper curing of the fish.

If a single house and a single curing stack is employed, the circulation will take place through that stack, as heretofore described; but, if desired, a plurality of such houses each containing a drying-stack may be located upon each side of the air-forcing mechanism, and the heating medium and the air may be diverted to each of the stacks either simultaneously, or, if desired, it may be temporarily cut off at one side by suitable gates $h$, which will divert the air to the other stack, and the alternate circulation of the cooled and heated air may in the same manner be effected by properly-disposed valves or cocks.

By this construction the cooling-stacks may be alternately heated and cooled to any desired degree and for the purpose of preventing the overheating of the fish and alternately providing warm and cool currents of dry air, which experience has shown to be most effective in properly curing the fish.

Having thus described my invention, what I claim, and desire to secure by Letters Patent, is—

1. The process of curing fish, said process consisting in first applying radiant heat between separated layers of fish, and subsequently subjecting the fish to alternate hot and cool air-currents by circulating alternately cooled and heated air through the interspaces between the supported fish.

2. The process of curing fish, said process consisting in first warming the fish by radiant heat between the fish, then allowing the warm air to escape and subjecting the fish to alternate hot and cool air-currents by circulating currents of alternately cooled and heated air above and below the superposed fish-supports.

3. The process of curing fish, said process consisting in first warming the fish by radiant heat applied between superposed and separated layers thereof, withdrawing the body of warm air and then circulating a current of heated air between the fish-trays, cooling the air, and again circulating said cooled air between the layers of fish.

4. The process of curing fish, said process consisting in first warming the fish by radiant heat applied between separated trays of fish, then circulating a body of air through the spaces between the fish, and subjecting the fish to alternate hot and cool air-currents by heating said air, and then cooling it between the periods of heating.

In testimony whereof I have hereunto set my hand in presence of two subscribing witnesses.

VICTOR WHITMAN. [L. S.]

Witnesses:
HARRY J. LASK,
JAS. C. HAYBURN.